(12) United States Patent
Lee et al.

(10) Patent No.: US 8,353,601 B2
(45) Date of Patent: *Jan. 15, 2013

(54) OPTICAL ASSEMBLY, BACKLIGHT UNIT HAVING THE SAME, AND DISPLAY APPARATUS THEREOF

(75) Inventors: Kum Tae Lee, Seoul (KR); Min Sang Kim, Seoul (KR); Moon Jeong Kim, Seoul (KR); Sung Young Park, Seoul (KR); Jeong Hwan Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/227,188

(22) Filed: Sep. 7, 2011

(65) Prior Publication Data

US 2012/0008339 A1 Jan. 12, 2012

Related U.S. Application Data

(63) Continuation of application No. 12/985,213, filed on Jan. 5, 2011, now Pat. No. 8,033,676.

(30) Foreign Application Priority Data

Jan. 7, 2010 (KR) .................. 10-2010-0001469

(51) Int. Cl.
*G09F 13/04* (2006.01)
*G02F 1/1335* (2006.01)

(52) U.S. Cl. .............. 362/97.1; 362/97.2; 362/97.3; 362/606; 362/611; 362/612; 349/58

(58) Field of Classification Search ............ 349/58, 349/65; 362/97.1–97.4, 608, 613, 555, 606, 362/607, 611, 612, 615–617
See application file for complete search history.

(56) References Cited

U.S. PATENT DOCUMENTS

| 6,580,477 B1 | 6/2003 | Cho |
| 6,927,812 B2 | 8/2005 | Cho |
| 7,695,182 B2 | 4/2010 | Iwasaki |

(Continued)

FOREIGN PATENT DOCUMENTS

CN 101025511 8/2007

(Continued)

OTHER PUBLICATIONS

Korean Notice of Allowance dated Oct. 15, 2010 for Application 2010-0001469.

(Continued)

*Primary Examiner* — Evan Dzierzynski
*Assistant Examiner* — Danielle Allen
(74) *Attorney, Agent, or Firm* — KED & Associates, LLP

(57) ABSTRACT

The backlight unit may include a plurality of optical assemblies, which each include a light emitting module having a substrate, a plurality of light emitting devices on a top surface of the substrate, and a connector provided on a bottom surface of the substrate and electrically connected to a power supply unit. The optical assembly may also include a light guide plate including a first part to receive the light and a second part to output the light through a top surface. The optical assembly may also include a side cover that may fix the light emitting module and a portion of the first part. The side cover may have a plurality of connector holes.

19 Claims, 13 Drawing Sheets

U.S. PATENT DOCUMENTS

| | | |
|---|---|---|
| 7,713,092 B2 | 5/2010 | Kim et al. |
| 7,771,108 B2 | 8/2010 | Iwasaki |
| 7,784,989 B2 | 8/2010 | Shin |
| 8,199,280 B2 | 6/2012 | Kim et al. |
| 8,289,267 B2 | 10/2012 | Park et al. |
| 2004/0114345 A1 | 6/2004 | Kim et al. |
| 2006/0221638 A1 | 10/2006 | Chew et al. |
| 2006/0227572 A1 | 10/2006 | Chen |
| 2007/0008457 A1 | 1/2007 | Takahashi et al. |
| 2008/0002392 A1* | 1/2008 | Kim ................. 362/97 |
| 2008/0030650 A1 | 2/2008 | Kitagawa et al. |
| 2008/0084696 A1* | 4/2008 | Yang et al. ............ 362/249 |
| 2009/0196069 A1 | 8/2009 | Iwasaki |
| 2009/0273732 A1 | 11/2009 | Shimura et al. |
| 2009/0290097 A1* | 11/2009 | Kim et al. ............ 349/65 |
| 2009/0303410 A1* | 12/2009 | Murata et al. ............ 349/58 |
| 2010/0265432 A1 | 10/2010 | Masuda et al. |
| 2010/0321421 A1 | 12/2010 | Kee |
| 2011/0020557 A1* | 1/2011 | Heuts et al. ............ 427/397 |
| 2011/0026243 A1* | 2/2011 | Lee et al. ............ 362/97.2 |
| 2011/0050557 A1 | 3/2011 | Hur et al. |
| 2011/0051045 A1* | 3/2011 | Hur et al. ............ 349/65 |
| 2011/0080532 A1* | 4/2011 | Ouchi et al. ............ 348/739 |
| 2012/0062816 A1 | 3/2012 | Tsubaki |
| 2012/0069265 A1 | 3/2012 | Murata et al. |
| 2012/0206670 A1 | 8/2012 | Kim et al. |

FOREIGN PATENT DOCUMENTS

| | | |
|---|---|---|
| CN | 101220915 | 7/2008 |
| CN | 101604094 | 12/2009 |
| CN | 101988662 | 3/2011 |
| EP | 2 124 078 | 11/2009 |
| EP | 2 136 225 | 12/2009 |
| EP | 2 280 218 | 2/2011 |
| JP | 08-021918 | 1/1996 |
| JP | 11-133421 | 5/1999 |
| JP | 2000-207917 | 7/2000 |
| JP | 2001-210129 | 8/2001 |
| JP | 2002-116440 | 4/2002 |
| JP | 2002-287138 | 10/2002 |
| JP | 2003-222862 | 8/2003 |
| JP | 2004-139871 | 5/2004 |
| JP | 2005-099463 | 4/2005 |
| JP | 2006-134748 | 5/2006 |
| JP | 2006-184347 | 7/2006 |
| JP | 2007-5302 | 1/2007 |
| JP | 2007-220369 | 8/2007 |
| JP | 2007-335324 | 12/2007 |
| JP | 2008-112663 | 5/2008 |
| JP | 2008-192395 | 8/2008 |
| JP | 2008-243558 | 10/2008 |
| JP | 2009-016095 | 1/2009 |
| JP | 2009-93808 | 4/2009 |
| JP | 2009-93939 | 4/2009 |
| JP | 2009-117349 | 5/2009 |
| JP | 2009-123590 | 6/2009 |
| JP | 2009-224301 | 10/2009 |
| JP | 2009-283465 | 12/2009 |
| JP | 2009-289663 | 12/2009 |
| JP | 2009-302053 | 12/2009 |
| KR | 2001-0012532 | 12/2001 |
| KR | 10-2004-00082132 | 9/2004 |
| KR | 10-2005-0051360 | 6/2005 |
| KR | 2007-0066100 | 6/2007 |
| KR | 2009-0121926 | 11/2009 |
| WO | WO 2009/017007 | 5/2009 |
| WO | WO 2009/098809 | 8/2009 |
| WO | WO 2009/102066 | 8/2009 |
| WO | WO 2009-157355 | 12/2009 |

OTHER PUBLICATIONS

Korean Office Action dated Nov. 9, 2010 for Application 2010-0001470.

European Search Report dated May 19, 2011 for Application 11150219.1.

Korean Office Action dated Oct. 15, 2010 for Application 2010-0001471.

Office Action dated Apr. 11, 2012 for U.S. Appl. No. 12/978,120.

Japanese Notice of Allowance for application JP103409P dated Oct. 15, 2012.

Chinese Office Action for application 201110005792.8 dated Sep. 24, 2012.

Japanese Office Action for Application 2011-000337 dated Sep. 11, 2012.

Chinese Office Action for Application 20111005786.2 dated Sep. 14, 2012.

Japanese Office Action for Application JP103410P dated Sep. 25, 2012.

* cited by examiner

Active Area

OPTICAL ASSEMBLY, BACKLIGHT UNIT HAVING THE SAME, AND DISPLAY APPARATUS THEREOF

CROSS-REFERENCE TO RELATED APPLICATION

This application is a continuation application of U.S. application Ser. No. 12/985,213, filed Jan. 5, 2011, now U.S. Pat. No. 8,033,676, (which claims priority from Korean Application No. 10-2010-0001469, filed Jan. 7, 2010), the subject matters of which are incorporated herein by reference.

BACKGROUND

1. Field

Embodiments may relate to an optical assembly, a backlight unit having an optical assembly, and/or a display apparatus thereof.

2. Background

A light emitting diode (LED) may constitute a light emitting source by using GaAs, AlGaAs, GaN, InGaN, and InGaAlP-based compound semiconductor materials.

An LED may be packaged so as to be used as a light emitting device that emits lights having various colors. The light emitting device may be used as a light source in various products such as a lighting indicator, a character indicator, and/or an image indicator.

BRIEF DESCRIPTION OF THE DRAWINGS

Arrangements and embodiments may be described in detail with reference to the following drawings in which like reference numerals refer to like elements wherein.

DETAILED DESCRIPTION

An embodiment may provide an optical assembly having a novel structure, a backlight unit having an optical assembly, and/or a display apparatus thereof.

An embodiment may provide an optical assembly simply manufactured and a backlight unit having the optical assembly.

An embodiment may provide a display apparatus capable of improving a contrast ratio and a definition of an image.

An embodiment may provide a display apparatus capable of reducing power consumption.

An embodiment may provide an optical assembly capable of improving reliability, a backlight unit having the optical assembly, and a display apparatus thereof.

The backlight unit (or backlight) may include a plurality of optical assemblies, which include a light emitting module having a substrate, a plurality of light emitting devices mounted on a top surface of the substrate to emit a light, and a connector provided on a bottom surface of the substrate and being electrically connected to a power supply. The backlight unit may further include a light guide plate including a first part through which the light is received and a second part to output the light, which is laterally received from the first part, through a top surface thereof. A first side cover may be provided over the light emitting module and the first part of the light guide plate, and a second side cover may be formed under the light emitting module and the light guide plate. The second side cover may have a plurality of connector holes. A bottom cover may receive the optical assemblies. The connector may also be inserted into one of the connector holes.

In a description of embodiments, it should be understood that when a layer (or film), a region, a pattern, and/or a structure is referred to as being "on" or "under" another substrate, another layer (or film), another region, another pad, or another pattern, it may be "directly" or "indirectly" on the other substrate, layer (or film), region, pad, or pattern, and/or one or more intervening layers may also be provided.

A thickness and a size of each layer shown in the figure drawings may be exaggerated, omitted and/or schematically drawn for the purpose of convenience or clarity. Additionally, the size of elements does not reflect an actual size.

An optical assembly, a backlight unit having the optical assembly, and a display apparatus thereof according to embodiments may be described with reference to accompanying drawings.

Figure 1:
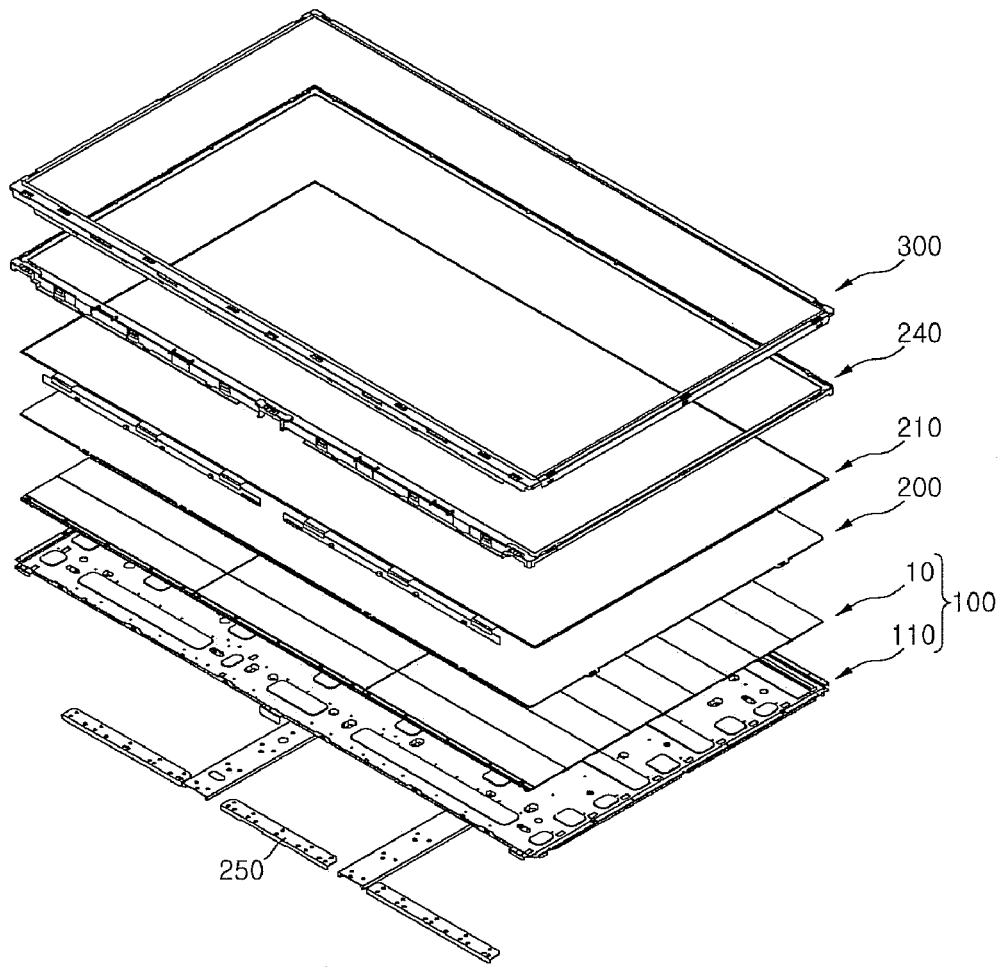
FIG. 1 is an exploded perspective view showing a display apparatus according to an embodiment.
Figure 2:
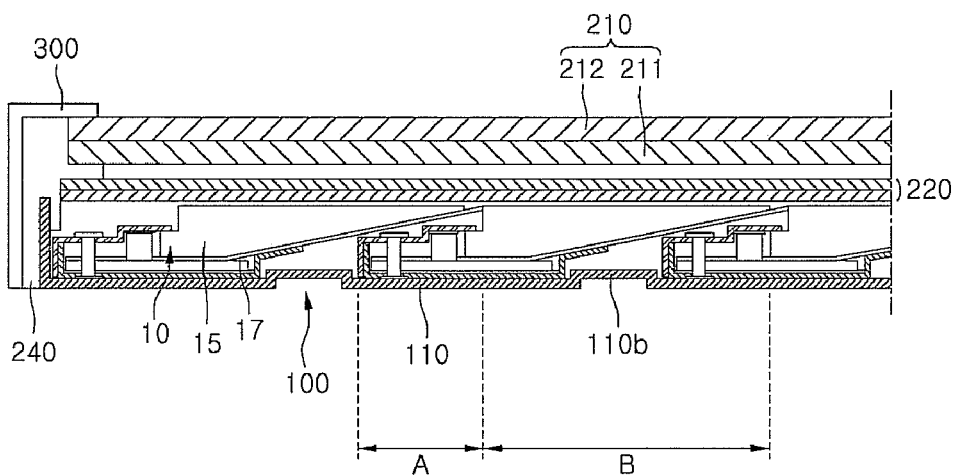
FIG. 2 is a sectional view showing a display apparatus according to an embodiment.

FIG. 1 is an exploded perspective view showing a display apparatus according to an embodiment. FIG. 2 is a sectional view showing a display apparatus according to an embodiment. Other embodiments and configurations may also be provided.

As shown in FIGS. 1 and 2, the display apparatus may include a backlight unit 100 (or backlight), an optical sheet part 220, a display panel 210, a support member 240 and a top cover 300. The backlight unit 100 may include a plurality of optical assemblies 10 to emit light and a bottom cover 110 to receive the optical assemblies 10 and form a lower outer appearance of the display apparatus. The optical sheet part 220 may diffuse light emitted from the backlight unit 100. The display panel 210 may display an image using the light emitted from the backlight unit 100. The support member 240, which may be provided at a front surface and at a peripheral region of the backlight unit 100, the optical sheet part 220, and the display panel 210 such that the backlight unit 100, the optical sheet part 220, and the display panel 210 are fixedly coupled with each other.

The display apparatus may include at least one beam member 250 longitudinally and/or transversely coupled with a bottom surface of the bottom cover 110 to prevent the bottom cover 110 from being warped (or being significantly warped) due to heat or physical force. The beam member 250 may extend in one direction, and may include metallic materials representing a coefficient of thermal expansion that is less than a coefficient of thermal expansion of the bottom cover 110 and may have a rigidity that is higher than that of the bottom cover 110.

The bottom cover 110 may be provided on a bottom surface thereof with a Power Supply Unit (PSU) and a driving circuit to drive the backlight unit 100 and the display panel 210.

The backlight unit 100 may include at least one optical assembly 10 to generate light and the bottom cover 110 to form a lower outer appearance of the display apparatus while receiving the at least one optical assembly 10.

The at least one optical assembly 10 may be individually driven such that an image can be naturally displayed. A plurality of divisional driving regions may be defined by the optical assemblies 10, and the display panel 210 may have a plurality of division regions corresponding to the optical assemblies 10. The optical assemblies 10 may adjust a brightness of the display panel 210 based on gray peak values or color coordination signals of the division regions of the display panel 210.

Figure 3:
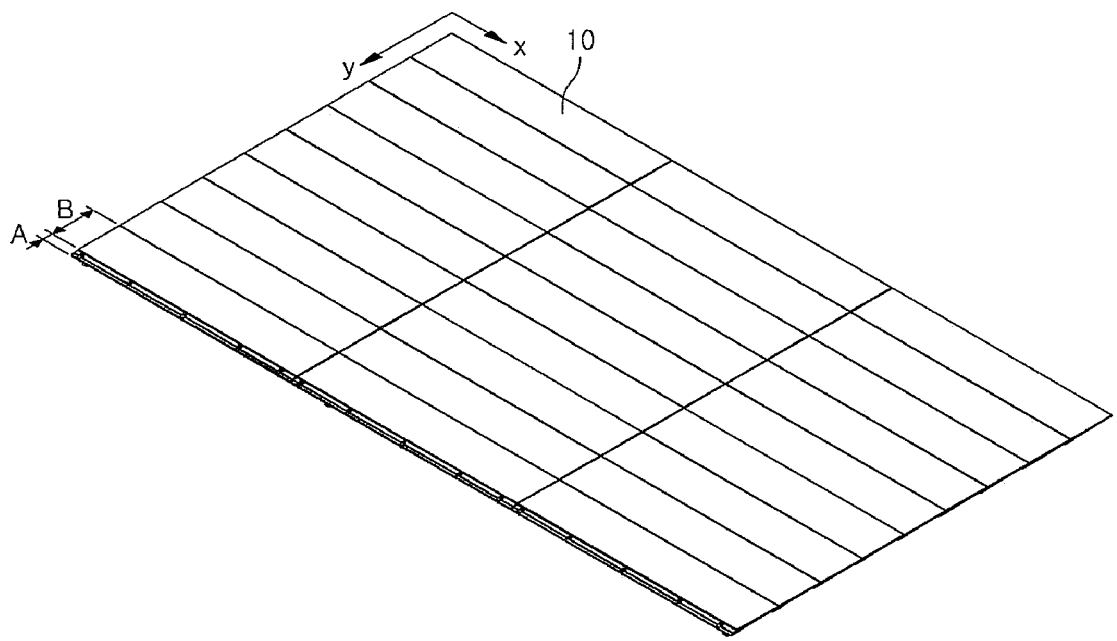
FIG. 3 is a perspective view showing a plurality of optical assemblies of a backlight unit according to an embodiment.
Figure 4:
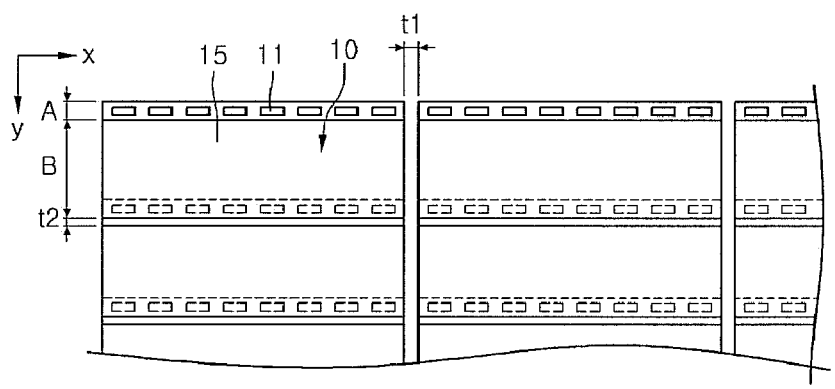
FIG. 4 is a view showing an arrangement of the optical assemblies of FIG. 3.

FIG. 3 is a perspective view showing an example arrangement of the optical assemblies 10 in the backlight unit 100 according to an embodiment. FIG. 4 is a view showing an arrangement of the optical assemblies 10.

As shown in FIGS. 2 and 4, the optical assemblies 10 provided in the backlight unit 100 may be arranged in the form of an N×M matrix (where N and M are natural numbers greater than or equal to 1) in x and y axis directions. For example, 27 optical assemblies 10 may be arranged in the form of a 3×9 matrix.

Predetermined regions of the optical assemblies 10 may overlap with each other. The optical assembly 10 may include a first region A in which a light is generated from a light source, and a second region B to diffuse the light and output the light through the front surface thereof. At least a portion of the first region A may be provided under the second region B of an adjacent optical assembly 10, so that the predetermined regions of adjacent optical assemblies 10 may overlap with each other.

The first region A may be blinded by the second region B of the adjacent optical assembly 10 through the above arrangement so that the top surface of the first region A may not be exposed to an exterior of the backlight unit 100. As shown in FIG. 3, first regions A of the optical assemblies 10 arranged at one edge of the backlight unit 100 may not overlap with each other, so that top surfaces of the first regions A at an edge of the backlight unit 100 may be exposed.

The optical assemblies 10 may be spaced apart from each other by a predetermined distance. For example, the optical assemblies 10 may be spaced apart from each other by a first distance t1 in the x axis direction, and may be spaced apart from each other by a second distance t2 in the y axis direction.

In the x axis direction, the optical assemblies 10 may not overlap with each other. In the y axis direction, the optical assemblies 10 may overlap with each other. Additionally, the second distance t2 in the y axis direction may indicate a distance between the second region B of one optical assembly 10 and the second region B of an adjacent optical assembly 10.

The distance among the optical assemblies 10 may represent the distance among light guide plates 15 provided in the optical assemblies 10, and the first distance t1 and the second distance t2 may represent the distances between the light guide plates 15.

The optical assemblies 10 may be spaced apart from each other by a predetermined distance as described above, so that the light guide plate 15 of the optical assembly 10 can be prevented from being thermally expanded and damaged due to heat emitted from the light source. If the light source includes a light emitting diode (LED) and the light guide plate 15 includes a resin material having a great Coefficient of Thermal Expansion (CTE), then the light guide plates 15 may thermally expand and may be damaged or the optical assemblies 10 may be misaligned and be defective due to heat emitted from the LED. However, the above defects may be minimized or removed due to arrangement of the optical assemblies 10 according to an embodiment.

For example, the first distance t1 may be in a range of approximately 0.5 mm to about 3 mm. The first distance t1 may also be in the range of approximately 1 mm to approximately 2 mm. Additionally, the second distance t2 may be in the range of approximately 0.5 mm to approximately 3 mm. Preferably, the second distance t2 may be in the range of approximately 0.8 mm to approximately 1.5 mm. The first and second distances t1 and t2 may vary according to the CTEs of materials constituting the optical assemblies 10 and/or arrangement of the optical assemblies 10, although embodiments are not limited thereto.

The optical assemblies 10 may be driven as an edge backlight type, and/or the optical assemblies 10 may be arranged as a direct backlight type to serve as one light source, thereby forming the backlight unit 100.

Accordingly, a light source may not cause hot spots on a screen. Therefore, thickness of the light guide plate 15 may be reduced, and a number of optical films may be reduced, so that a slim backlight unit may be realized.

The optical assemblies 10 may be individually driven. Therefore, an image having improved quality may be realized through a divisional driving scheme.

For example, the backlight unit 100 may be driven through a full driving scheme or a partial driving scheme such as local dimming and/or impulsive driving. The backlight unit 100 may be variously driven based on the circuit design.

If the backlight unit 100 is driven using the partial driving scheme, a contrast ratio may increase, and an image for dark and bright portions on a screen can be definitely expressed, so that image quality can be improved. The backlight unit 100 may be divided into a plurality of divisional driving regions and a brightness of each divisional driving region may decrease in a dark portion of an image, and increase in a bright portion of the image based on image signals, so that a contrast ratio and a definition of the image can be improved.

The backlight unit 100 may also employ the partial driving scheme, so that power consumption can be reduced, and manufacturing cost may be reduced.

A structure of the optical assembly 10 may be described in detail.

Figure 5:
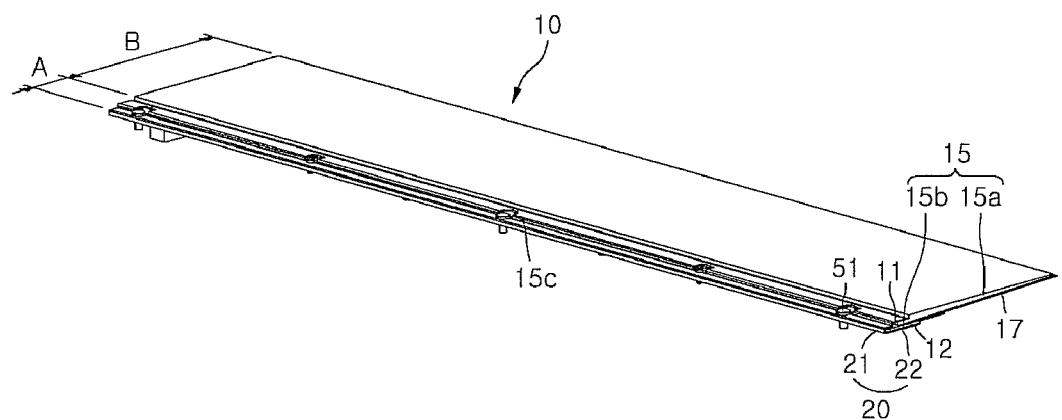
FIGS. 5 and 6 are perspective views showing a top surface of an optical assembly according to the embodiment.
Figure 6:
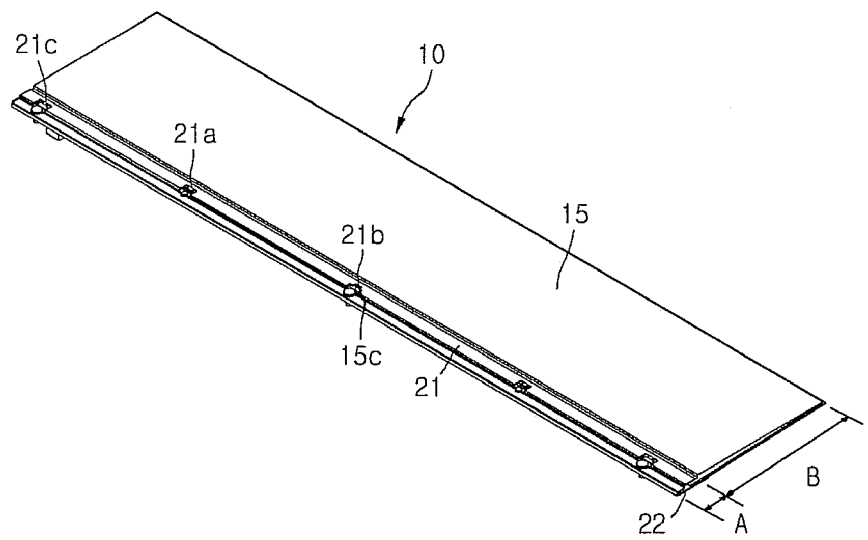
Figure 7:
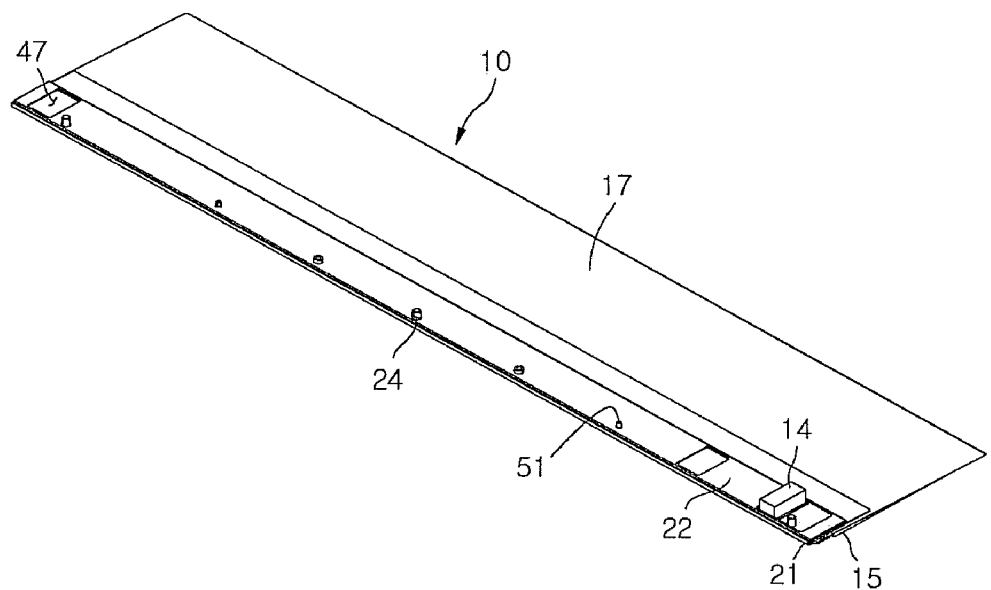
FIG. 7 is a perspective view showing a bottom surface of an optical assembly according to the embodiment.
Figure 8:
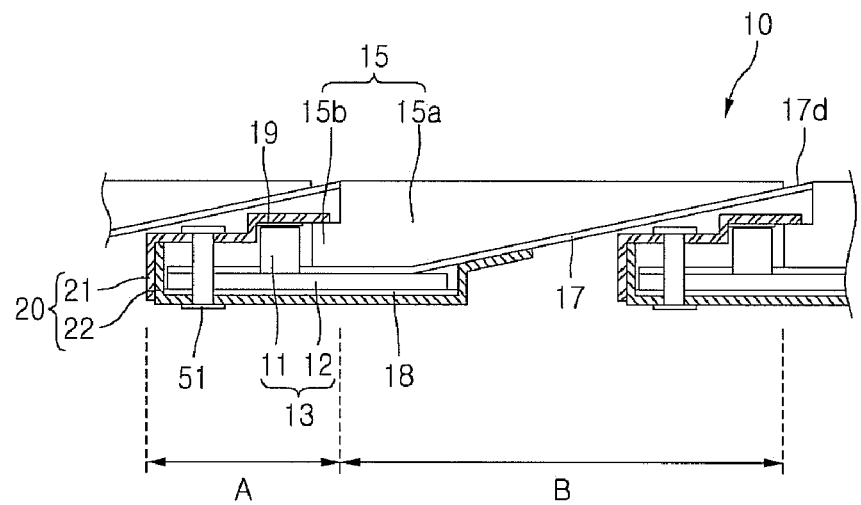
FIG. 8 is a sectional view showing an optical assembly according to an embodiment.

FIGS. 5 and 6 are perspective views showing a top surface of the optical assembly 10. FIG. 7 is a perspective view showing a bottom view of the optical assembly 10. FIG. 8 is a sectional view showing the optical assembly 10.

As shown in FIGS. 5 to 8, the optical assembly 10 may include a light emitting module 13, the light guide plate 15, a reflective sheet 17 and a side cover 20. The light emitting module 13 may serve as a light source to generate a light. The light guide plate 15 may diffuse a light laterally received from the light emitting module 130 such that the light is output to the top. The reflective sheet 17 may be provided under the light guide plate 15. The side cover 20 may be provided at one lateral surface of the light guide plate 15 to surround the light emitting module 13 so that the light guide plate 15 is fixedly coupled with the light emitting module 13. The side cover 20 may be provided over a portion of the light guide plate 15, at a side of the light emitting module 13 and under the light emitting module 13, as shown in FIG. 8.

The side cover 20 may include a first side cover 21 and a second side cover 22. The first side cover 21 may be provided at an upper portion of a first part 15b of the light guide plate 15 and on a top surface of the light emitting module 13. The second side cover 22 may be coupled with the first side cover 21 to support at least a portion of the light emitting module 13 and a bottom surface of the first part 15b of the light guide plate 15.

The light guide plate 15 may include a first part 15b and a second part 15a. A light generated from the light emitting module 13 may be laterally received through the first part 15b such that the light is introduced into the light guide plate 15. Through the second part 15a, light introduced into the first part 15b is converted into a surface light and output toward the display panel 210.

The second part 15a may include a top surface from which the surface light is emitted, a bottom surface opposite to the top surface, and four lateral surfaces. The first part 15b may protrude in a horizontal direction along a lower portion of one of lateral surfaces of the second part 15a of the optical assembly.

Adjacent optical assemblies 10 may overlap with each other by arranging a first region A under a second region B. Overlap of the optical assemblies 10 may be described based on structure of the optical assemblies 10. The first region A may include the light emitting module 13 and the first part 15b of the light guide plate 15, and the second region B may include the second part 15a of the light guide plate 15.

The second part 15a may gradually thin (or decrease in thickness) as the second part 15a is away from the first part 15b. The bottom surface of the light guide plate 15 may be inclined at a predetermined angle so that thickness of the light guide plate 15 may gradually decrease in one direction away from the first part 15b. As described above, the bottom surface of the light guide plate 15 may be inclined, so that a light introduced into the light guide plate 15 can be effectively output through the top surface due to reflection and scattering.

Figure 9:
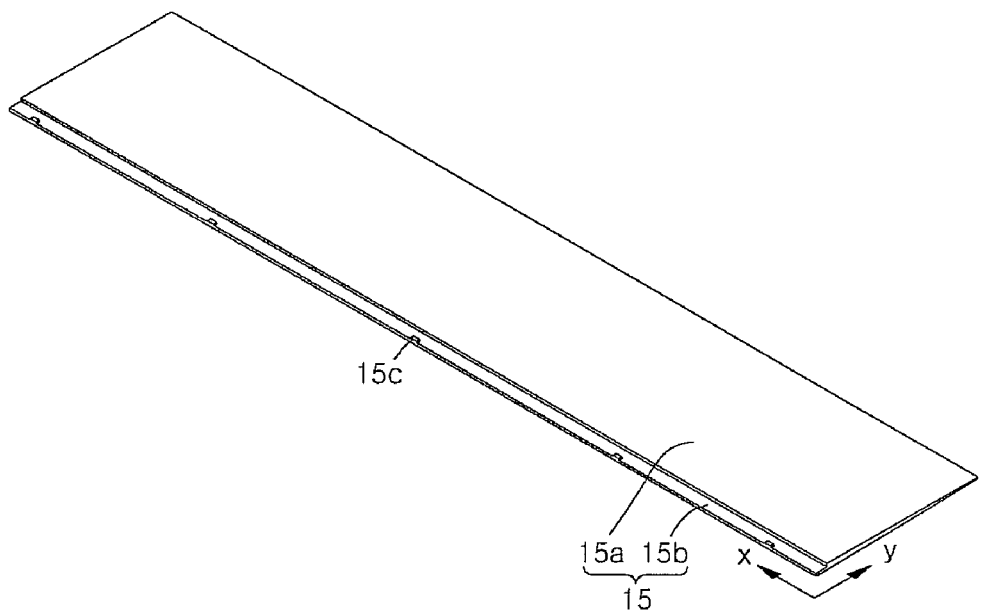
FIG. 9 is a perspective view showing a light guide plate of an optical assembly according to an embodiment.
Figure 10:
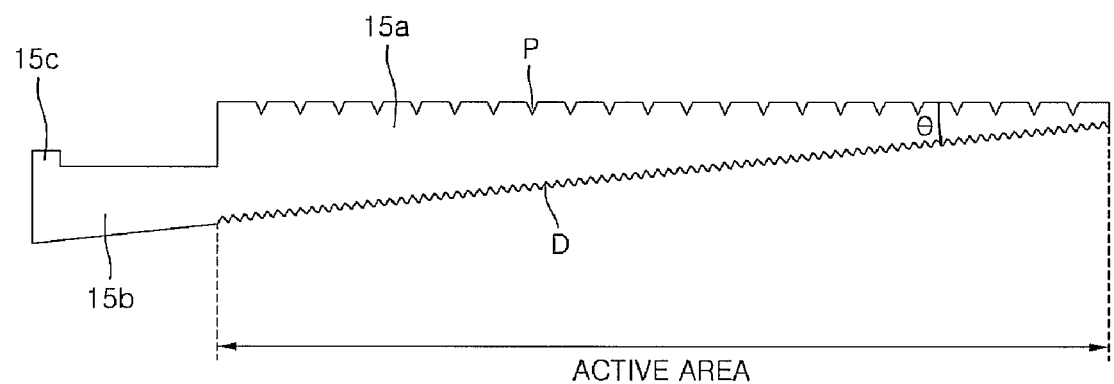
FIG. 10 is a sectional view showing a light guide plate of an optical assembly according to an embodiment.
Figure 11:
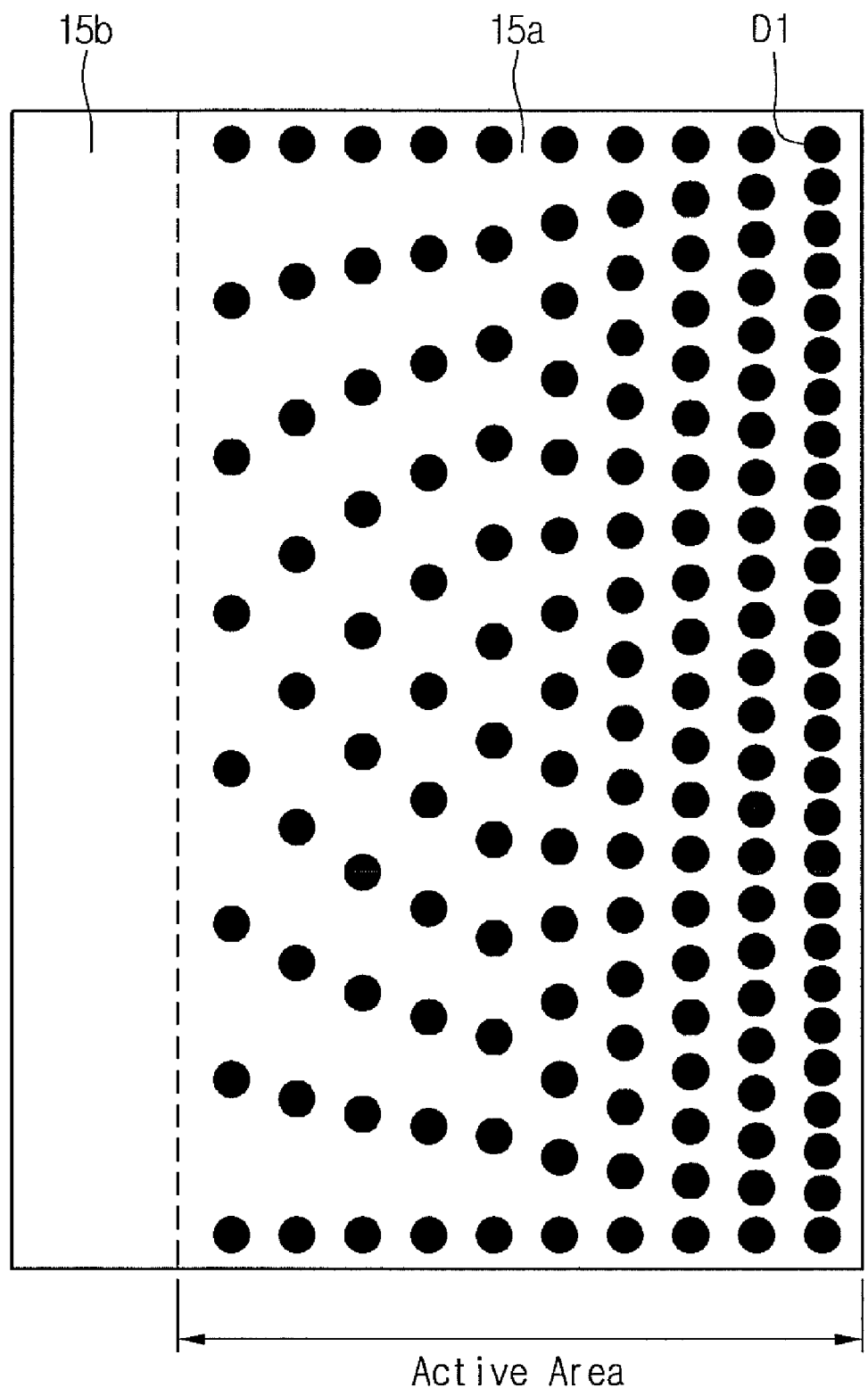
FIG. 11 is a bottom view showing a light guide plate of an optical assembly according to the embodiment.

FIG. 9 is a perspective view showing the light guide plate 15. FIG. 10 is a sectional view showing the light guide plate 15. FIG. 11 is a plan view showing a bottom surface of the light guide plate 15.

As shown in FIGS. 9 and 10, an angle θ formed between a top surface and a bottom surface of the light guide plate 15 may be in the range of approximately 1° to approximately 5°. The angle θ may also be in the range of approximately 1.4° to approximately 1.8°, although embodiments are not limited thereto. The angle θ may allow light introduced into the first part 15b of the light guide plate 15 to scatter and be reflected by the bottom surface of the light guide plate 15 and then be efficiently outputted through the top surface of the light guide plate 15.

A scattering pattern D may be provided on the bottom surface of the light guide plate 15. A prism pattern P may be provided on the top surface of the light guide plate 15.

The scattering pattern D may allow light to be scattered and diffused. As one example, the scattering pattern D may be a dot pattern.

As shown in FIG. 10, the scattering pattern D may be formed in an active area corresponding to the second part 15a of the light guide plate 15. The active area may diffuse the light introduced into the light guide plate 15 through scattering and diffuse-reflection and then output the light to the top surface of the light guide plate 15. Accordingly, the scattering pattern D may not be formed in a region (for example, the first part 15b) excluding the active area of the light guide plate 15.

The scattering patterns D may be formed in various densities based on areas and a width of the light guide plate 15 into consideration, and an intensity and an orientation angle of the light emitted from the light source. The density of dot patterns D may increase or reduce in one direction. For example, as shown in FIG. 11, the dot patterns D may include scattering patterns D1 having a density in the active area that increases as the scattering patterns D1 are away from the first part 15b.

The removed region from the first part 15b has the scattering patterns D1 more than the near region to the first part 15b, and the scattering patterns D1 diffuse the light from the first part 15b enough in the removed region so that the uniformity of the light can be secured across the whole second part 15a.

The density of the scattering patterns D1 may increase or decrease in one direction. The prism patterns P may allow the light diffused by the light guide plate 15 to be concentrated toward the display panel 210 provided over (or on) the light guide plate 15. Since the light diffused by the light guide plate 15 has no directionality, the light may concentrate based on the prism pattern P such that the light is vertically received toward the display panel 210.

The prism patterns P may be formed in a horizontal direction or a vertical direction with respect to the longitudinal direction of the light guide plate 15 based on design of the optical assembly 10, although embodiments are not limited thereto.

At least one protrusion 15c may be formed on a top surface of the first part 15b of the light guide plate 15.

The protrusion 15c may protrude a predetermined height from the top surface of the first part 15b. If a plurality of protrusions 15c are provided, the protrusions 15c may be formed in a line along an x axis direction. Hereinafter, embodiments may be described with respect to five protrusions 15c.

The protrusion 15c may have various shapes. For example, the protrusion 15c may have a shape of a rectangular prism, a polygonal prism, a cylinder, a truncated circular cone, and/or a truncated polygonal pyramid. The protrusion 15c may be formed as a prism shape having a step difference at a lateral surface thereof.

The protrusion 15c may be inserted into a hole of the first side cover 21, thereby preventing the light guide plate 15 from being shaken, so that the first side cover 21 can be firmly coupled with the light guide plate 15.

The protrusion 15c may have a height of approximately 0.3 mm to approximately 0.6 mm from the top surface of the first part 15b. The protrusion 15c may have a width along the x axis direction of approximately 2 mm to approximately 5 mm. The protrusion 15c may have a width along the y axis direction of approximately 1 mm to approximately 3 mm.

The top surface of the protrusion 15c may be aligned with the top surface of the first side cover 21. As one example, if the protrusion 15c protrudes from the top surface of the first side cover 21, an assembling performance of the optical assemblies 10 may be lowered. As one example, if a height of the protrusion 15c is low, the light guide plate 15 may be released from the first side cover 21.

The protrusion 15c may be formed near a light received surface of the top surface of the first part 15b. The closer the protrusion 15c is located to the light received surface, the bigger angle difference between the direction of the light and the protrusion 15c becomes, and this prevents the light loss through the protrusion 15c.

This may prevent optical interference from occurring with respect to a light generated from the light emitting module 13 by the protrusion 15c.

Embodiments may not be limited to a position and/or a size of the protrusion 15c. The protrusion 15c may have various positions and sizes according to the CTE of the light guide plate 15 and a design of the optical assembly 10.

The light guide plate 15 may include a transmissive material. For example, the light guide plate 15 may include one selected from the group consisting of acrylic resin-based materials such as polymethyl methacrylate (PMMA), polyethylene terephthalate (PET), poly carbonate (PC), and/or polyethylene naphthalate (PEN).

Figure 12:
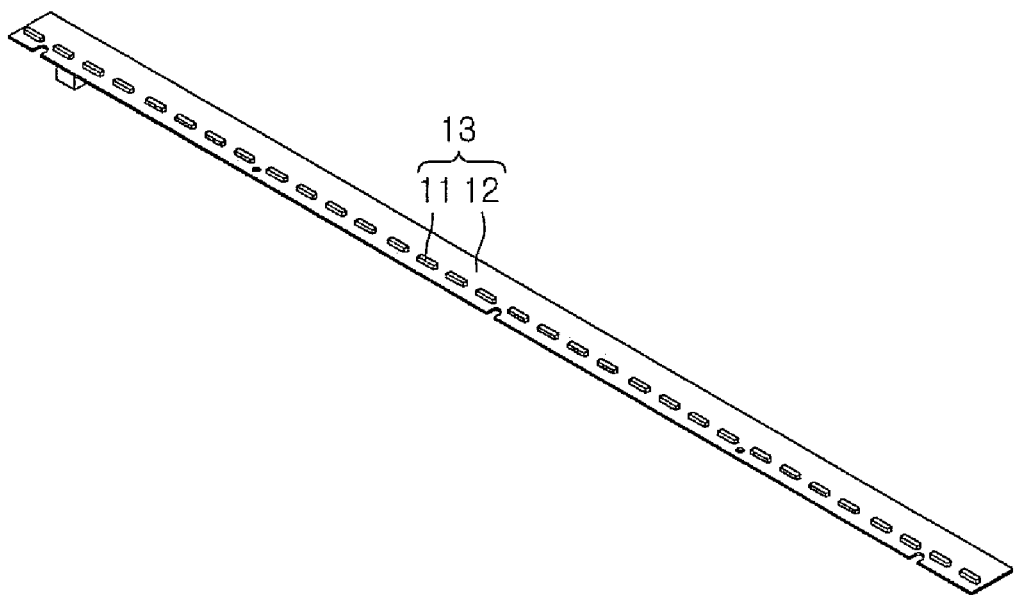
FIG. 12 is a perspective view showing a top surface of a light emitting module of an optical assembly according to an embodiment.
Figure 13:
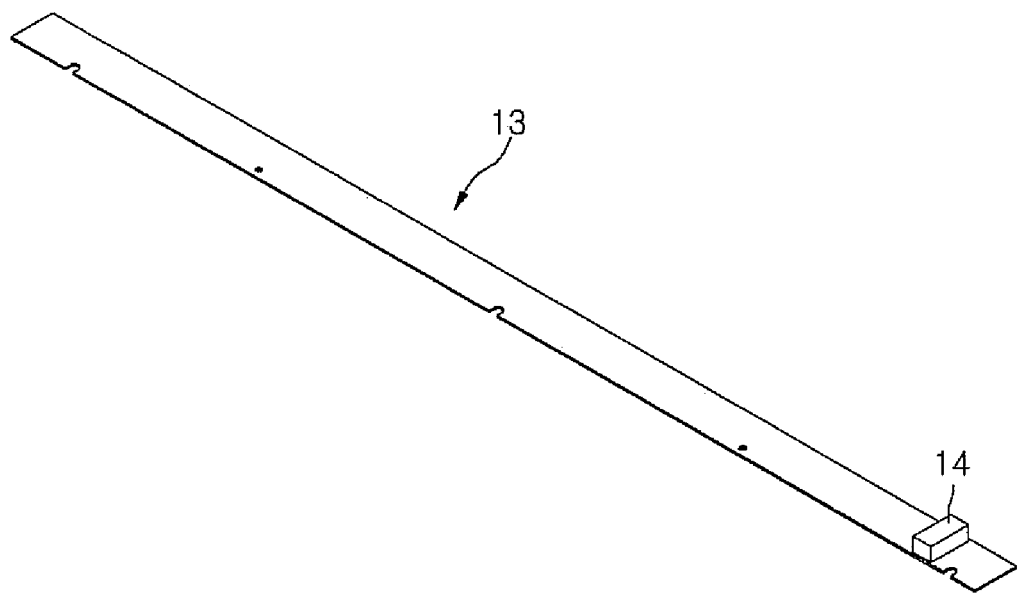
FIG. 13 is a perspective view showing a bottom surface of a light emitting module of an optical assembly according to an embodiment.
Figure 14:
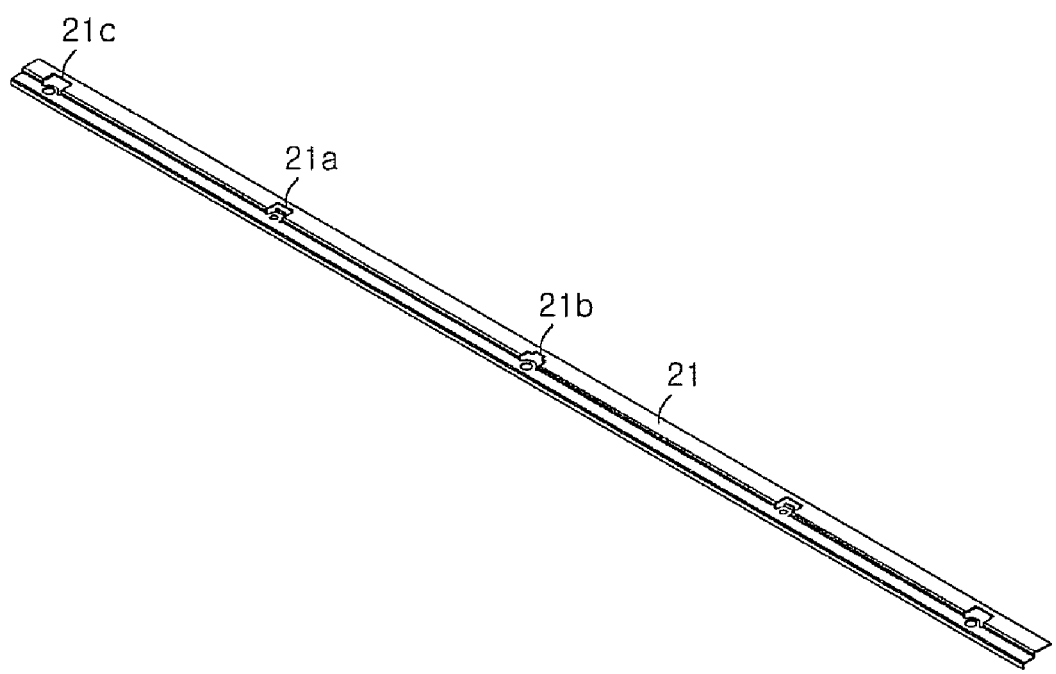
FIGS. 14 and 15 are views showing a first side cover of an optical assembly according to an embodiment.

FIG. 12 is a perspective view showing a top surface of the light emitting module 13. FIG. 13 is a perspective view showing a bottom surface of the light emitting module 13.

As shown in FIGS. 8, 12, and 13, the light emitting module 13 may be provided at a lateral surface of the first part 15b of the light guide plate 15.

The light emitting module 13 may include a substrate 12, at least one light emitting device 11 on a top surface of the substrate 12, and a connector 14 formed on a bottom surface of the substrate 12.

The substrate 12 may include a Printed Circuit Board (PCB), a metal core PCB, and/or a flexible PCB, although embodiments are not limited thereto.

For example, the light emitting device 11 may include at least one light emitting diode (LED), and the LED may include at least one of a color LED to emit a red, green, blue, or white light and/or an Ultra Violet (UV) LED to emit an ultra violet ray.

A plurality of light emitting devices 11 may be provided on the top surface of the substrate 12 along the x axis direction, and the light emitting devices may be spaced apart from a lateral surface of the first part 15b by a predetermined distance (FIG. 8). For example, the light emitting devices 11 may be spaced apart from the lateral surface of the first part 15b by the distance in the range of approximately 0.01 mm to approximately 0.5 mm, and preferably in the range of approximately 0.05 mm to approximately 0.2 mm. This is because the light emitting devices 11 and the light guide plate 15 may degrade when the light emitting devices 11 contact the lateral surface of the fist part 15b.

The distance t3 between the light emitting devices 11 and the light guide plate 15 may be mechanically maintained by coupling the first side cover 21 to the protrusion 15c of the light guide plate 15. The distance between the light emitting devices 11 and the light guide plate 15 may minimize a process error that occurs in the assembling process.

The driving of the light emitting devices 11 may be controlled in the unit of n light emitting devices. For example, if 32 light emitting devices 11 are mounted on the substrate 12, driving of the 32 light emitting devices 11 may be controlled in the unit of four light emitting devices. In a same optical assembly 10, the light emitting devices 11 may be driven in the unit of n light emitting devices, so that effects of the partial driving scheme can be maximized.

The connector 14 may be formed on the bottom surface of the substrate 12, and may be electrically connected to the PSU to supply power to the light emitting devices 11.

The connector 14 may be inserted into one of a plurality of connection holes of the second side cover 22, and the connector 14 may pass through the second side cover 22 so that the connector 14 may be electrically connected to the PSU.

The connector 14 may have different positions based on the optical assemblies 10. The arrangement of the optical assemblies 10 and the master/slave relationship of the optical assemblies 10 may be determined based on a position of the connector 14.

The light emitting module 13 may include a first light emitting module serving as a master and a second light emitting module serving as a slave driven dependently from the first light emitting module. A position of the connector 14 in the first light emitting module may be different from a position of the connector 14 in the second light emitting module. Accordingly, an arrangement position of the first light emitting module may be distinguished from an arrangement position of the second light emitting module. Therefore, productivity in the assembling process of the backlight unit 100 may be improved.

FIGS. 14 and 15A to 15C are views showing the first side cover 21.

As shown in FIGS. 6 and 14, and FIGS. 15A to 15C, the first side cover 21 may be provided over the light emitting module 13 and the light guide plate 15 to firmly couple the light emitting module 13 with the light guide plate 15.

The first side cover 21 may have a step difference. A lower portion of the step difference may be coupled with the second side cover 22 and the light emitting module 13 by a coupling member such as a screw. An upper portion of the step difference may be provided on a top surface of the first part 15b of the light guide plate 15.

The first side cover 21 may include a plurality of first to third holes 21a, 21b, and 21c. As shown in FIG. 6, the protrusions 15c of the light guide plate 15 may be inserted into the first to third holes 21a, 21b, and 21c so that the light guide plate 15 can be firmly coupled with the first side cover 21.

The first to third holes 21a, 21b, and 21c may have a same shape and/or different shapes, and/or at least one of the first to third holes 21a, 21b, and 21c may have a different shape. At least one of the first to third holes 21a, 21b, and 21c may have a shape exactly corresponding to the shape of the protrusion 15c.

Figure 15:
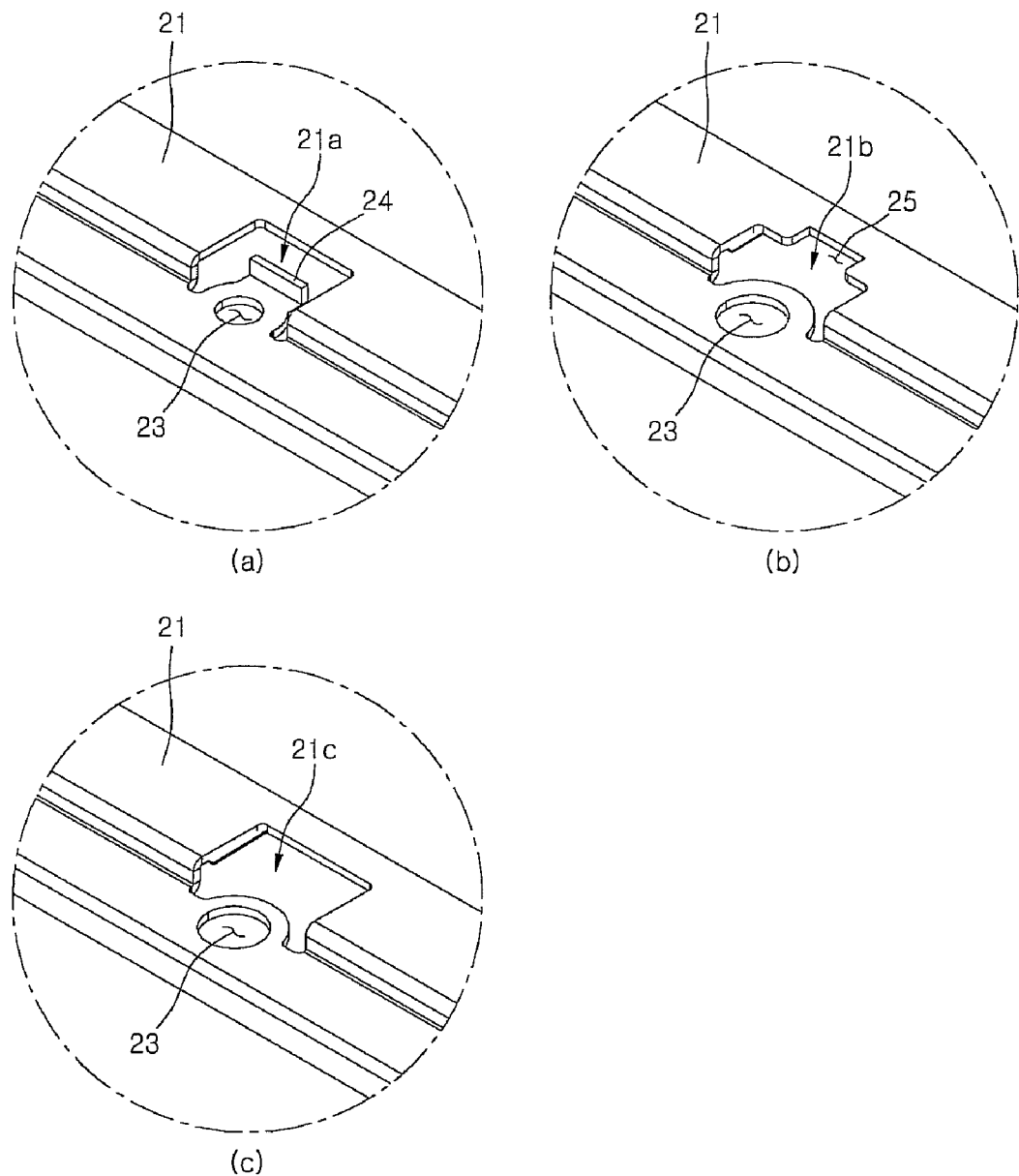

FIGS. 15A to FIG. 15C show examples of the first to third holes 21a, 21b, and 21c having various shapes.

As shown in FIG. 15A, the first hole 21a may include a terminal part 24 that makes contact with the lateral surface of the protrusion 15c. As shown in FIG. 15B, the second hole 21b may include an insertion part 25 that corresponds exactly to the protrusion 15c4. As shown in FIG. 15C, the third hole 21c may have a width greater than a width of the protrusion 15c.

According to an embodiment, the first side cover 21 may be provided with the first to third holes 21a, 21b, and 21c having various shapes, so that the first side cover 21 may be fixedly coupled with the light guide plate 15, and an assembling tolerance, which may occur in a manufacturing process of the optical assembly 10, may be reduced.

The protrusions 15c of the light guide plate 15 may be inserted into and coupled with the first to third holes 21a, 21b, and 21c of the first side cover 21, so that the distance between the light emitting devices 11 and the light guide plate 15 may be mechanically maintained.

At least one of the first to third holes 21a, 21b, and 21c may have a shape exactly corresponding to the shape of the protrusion 15c.

This is because a free space may be ensured by taking into consideration a thermal expansion of the light guide plate 15, so that reliability of the optical assembly 10 can be ensured. According to an embodiment, only the second hole 21b may be formed to correspond exactly to the protrusion 15c, and the remaining first and third holes 21a and 21c may serve as a free space to prepare for thermal expansion of the light guide plate 15.

A first hole 23 may be formed adjacent to the first to third holes 21a, 21b, and 21c such that the first side cover 21, the second side cover 22, and the light emitting module 13 may be coupled with each other by a coupling member such as a screw 51. However, the first coupling hole 23 may be formed at various positions.

As shown in FIGS. 7 and 8, the side cover 20 may be provided at lower portions of the light guide plate 15 and the light emitting module 13. The second side cover 22 may be fixedly coupled with the first side cover 21 and the light emitting module 13.

The second side cover 22 may include a groove to receive the light emitting module 13. One end of the second side cover 22 may extend along the bottom surface of the light guide plate 15.

The second side cover 22 may include a plurality of connector holes 47, as shown in FIG. 7, into which the connector 14 of the light emitting module 13 may be inserted. The connector 14 may be inserted into one of the connector holes 47. The connector 14 may receive power from the PSU.

The light emitting module 13 may include the first light emitting module serving as a master and the second light emitting module serving as a slave, and a position of the first light emitting module may be different from a position of the second light emitting module. Accordingly, the connector holes 47 may be formed in the second side cover 22, so that the second side cover 22 may be compatibly used.

If only one connector hole is formed in the second side cover 22, since side covers coupled with the first and second light emitting modules, respectively, have to be individually formed, the assembling process may be complicated.

Therefore, a total number of the connector holes 47 may be n+1 corresponding to a sum of one first light emitting module (serving as a master) and n second light emitting modules (serving as a slave).

The second side cover 22 may be provided therein with a second hole 24 coupled with a coupling member, such as the screw 51, passing through the first side cover 21, the second side cover 22, and the light emitting module 13.

The side cover 20 may include a metallic material or a resin material.

A thermal pad 18 may be provided between the light emitting module 13 and the second side cover 22. The thermal pad 18 may be under the light emitting module 13, and may be formed therein with holes corresponding to the connector holes 47.

Since the thermal pad 18 includes a material (such as metal or graphite) having a high thermal conductivity, heat emitted from the light emitting module 13 may be transferred to the second side cover 22.

As shown in FIG. 8, a reflective sheet 17 may be provided under the light guide plate 15 and over the light emitting module 13 of an adjacent optical assembly.

The reflective sheet 17 may reflect a light, which is laterally received through the first part 15b of the light guide plate 15, upward after the light has been diffused in the light guide plate 15. The reflective sheet 17 may block light emitted from another optical assembly 10.

A sub reflective sheet 19 may be provided between the first side cover 21 and the light emitting devices 11 as well as under the light guide plate 15. The sub reflective sheet 19 may reflect light received from the light emitting devices 11 toward the light guide plate 15.

Figure 16:
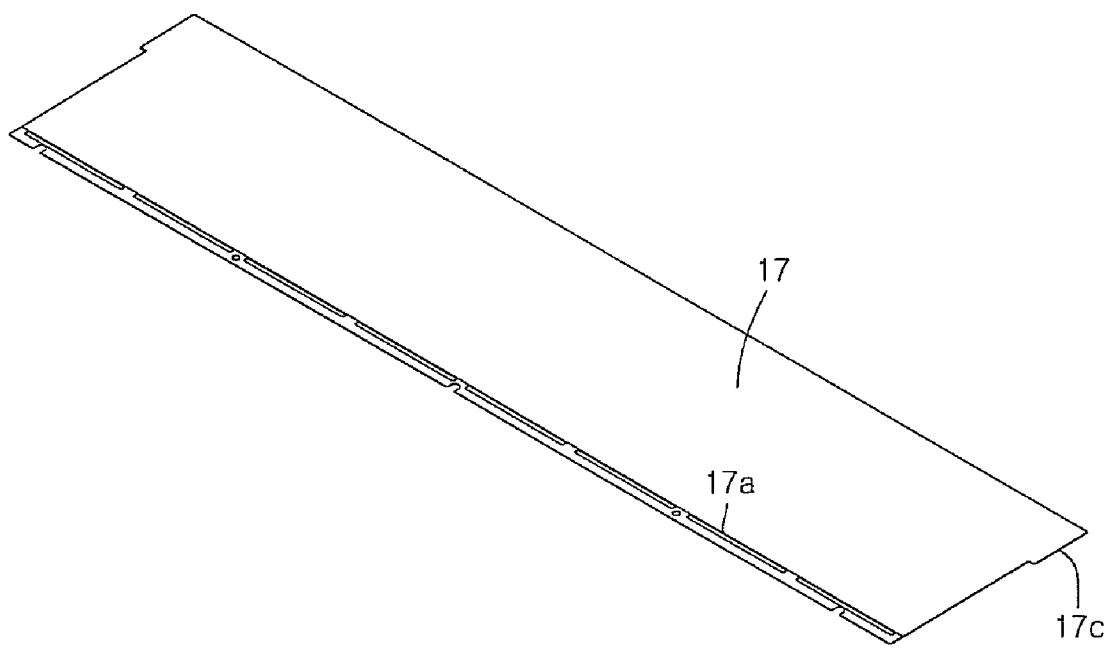
FIG. 16 is a perspective view showing a reflective sheet of an optical assembly according to an embodiment.
Figure 17:
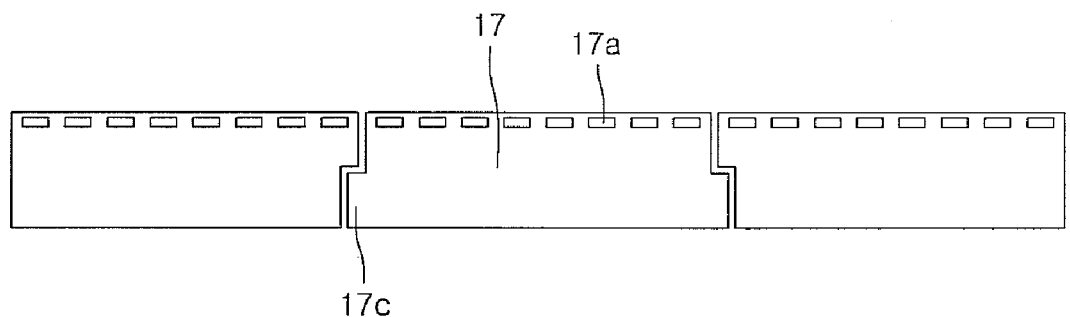
FIG. 17 is a view showing an arrangement of reflective sheets of optical assemblies according to an embodiment.

FIG. 16 is a perspective view showing the reflective sheet 17. FIG. 17 is a view showing an arrangement relation of a plurality of reflective sheets 17.

As shown in FIGS. 8, 16, and 17, the reflective sheet 17 may be provided in the form of a film that includes exposure holes 17a to expose the light emitting devices 11. While exposing the light emitting devices 11, the exposure holes 17a may be blocked by the light emitting devices 11, so that the reflective sheet 17 may be attached (or fixed) without an adhesive agent.

For example, the reflective sheet 17 may include at least one selected from the group consisting of PET, PC, and PVC, although embodiments are not limited thereto.

As shown in FIG. 17, lateral surfaces of reflective sheets 17 may have a step structure 17c. The step structures 17c may correspond to the step difference structures 17c of adjacent reflective sheets 17 so that the reflective sheets 17 may be prevented from being shaken.

The reflective sheet 17 may cover a whole bottom surface of the light guide plate 15, and one end 17d (FIG. 8) of the reflective sheet 17 may further extend to a space between the adjacent light guide plates 15. The reflective sheets 17 may be formed under the space of the first distance t1 and the space of the second distance t1.

Since the optical assemblies 10 are spaced apart from each other by a predetermined distance by taking thermal expansion into consideration, the light loss may be prevented when the reflective sheets 17 are located among the optical assemblies 10. According to an embodiment, although the optical assemblies 10 are spaced apart from each other by the predetermined distance by taking into consideration the CTE of the light guide plates 15, the reflective sheets 17 may be arranged without the gap therebetween, so that light loss may be minimized.

The manufacturing process of the backlight unit 100 achieved by assembling the optical assemblies 10 may be simplified, and failures may be minimized in the assembling process, so that productivity of the backlight unit 100 may be improved.

Failures caused by a scratch of the light guide plate in the assembling process of the backlight unit 100 may be reduced, and optical mura may be prevented, so that reliability for the manufacturing process may be improved, and quality of the backlight unit 100 may be improved.

According to an embodiment, the optical assemblies 10 may be standardized and mass-produced so that the optical assemblies 10 are applicable to backlight units having various sizes.

If one of the optical assemblies 10 of the backlight unit 100 according to an embodiment is defected, since only the defected optical assembly 10 may be replaced with a new one without replacing the backlight unit 100, so that replacement work may be easily performed, and cost of the replacement of parts may be reduced.

The optical assembly 10 and the backlight unit 100 having the same may represent superior durability against external impact or variation of an external environment.

Since the optical assemblies 10 of the backlight unit 100 may overlap with a portion of adjacent optical assemblies 10, a bright line and/or a dark line may be prevented from occurring at a boundary between the optical assemblies 10, so that uniformity of a light can be ensured.

Figure 18:
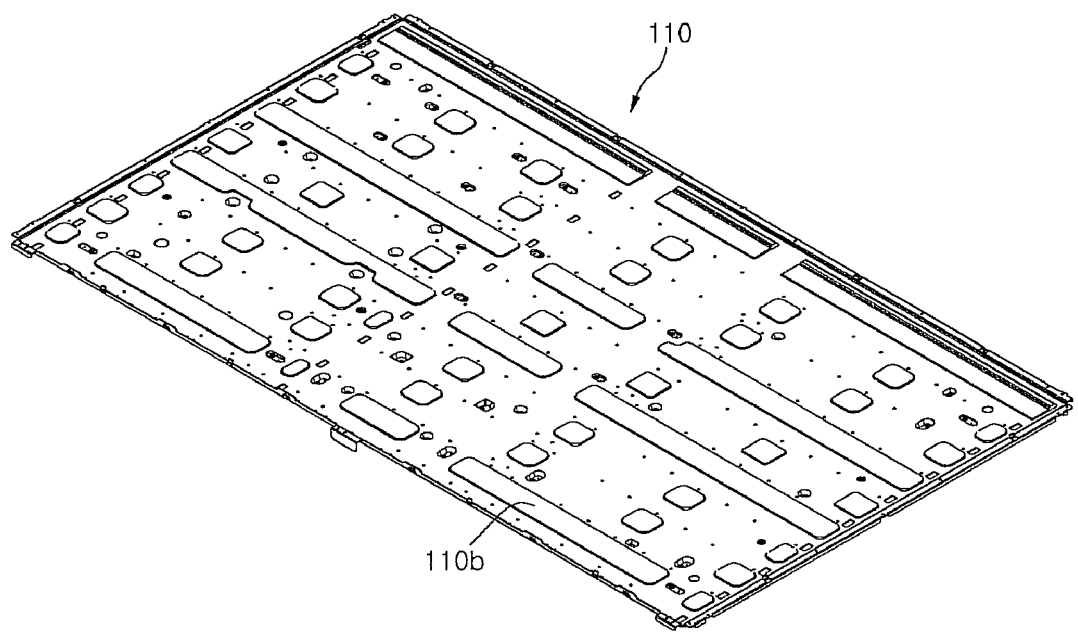
FIG. 18 is a perspective view showing a bottom cover of a display apparatus according to an embodiment.
Figure 19:
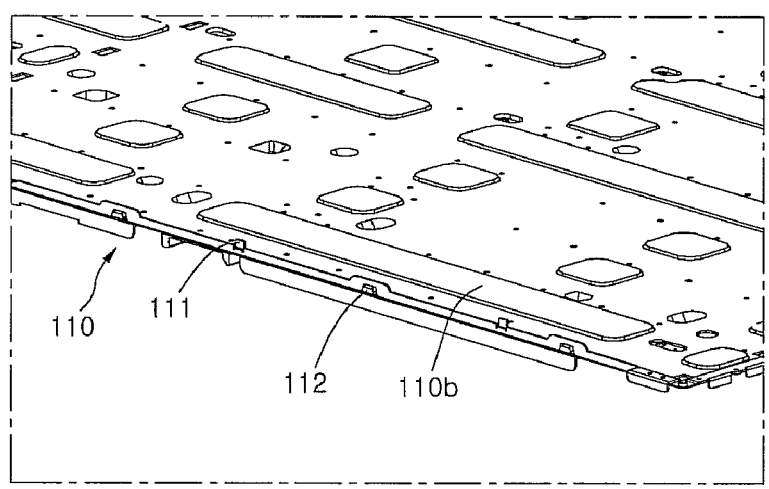
FIG. 19 is an enlarged view showing a sidewall of the bottom cover of FIG. 18.

FIG. 18 is a perspective view of the bottom cover 110 of the display apparatus according to an embodiment. FIG. 19 is an enlarged view showing a sidewall of the bottom cover 110.

As shown in FIGS. 2, 18, and 19, the optical assemblies 10 may be received in the bottom cover 110 to provide the backlight unit 100.

The bottom cover 110 may be formed in the shape of a box having an open top surface to receive the optical assemblies 10.

The optical assemblies 10 may be vertically inserted in the bottom cover 110 and may be simply assembled. For example, the optical assemblies 10 mounted on the bottom surface of the bottom cover 110 may be locked with the bottom cover 110 by a coupling member protruding from the bottom surface of the bottom cover 110, so that the optical assemblies 10 may be attached to an accurate position in the bottom cover 110.

The bottom cover 110 may include a metallic material and/or a resin material having high thermal conductivity to effectively dissipate heat, although embodiments are not limited thereto.

At least one heat dissipation protrusion 110b may be formed on the bottom surface of the bottom cover 110. The heat dissipation protrusion 110 may protrude out from the bottom surface of the bottom cover 110.

The heat dissipation protrusion 110b may increase a surface area of the bottom cover 110 to improve heat dissipation efficiency while supporting the optical assemblies 10.

The heat dissipation protrusions 110b may be formed corresponding to a lower portion of the second region B of the optical assemblies 10. A width of the heat dissipation protrusions 110b may correspond to at least a half of the width of the second region B.

Since the bottom surface of the light guide plate 15 of the optical assembly 10 is inclined, a space to form the heat dissipation protrusion 110b may be ensured under the second region B of the optical assemblies 10.

The heat dissipation protrusions 110b may protrude to make line contact with or make surface contact with the bottom surface of the optical assemblies 10, so that the heat dissipation protrusions 110b may support the optical assemblies 10. However, the heat dissipation protrusions 110b may not contact with the optical assemblies 10, although embodiments are not limited thereto.

The heat dissipation protrusion 110b may have a shape of an island, as shown in FIG. 18, and the shape of the island may extend in one direction or may have an approximately circular shape.

The heat dissipation protrusion 110b may prevent the bottom cover 110 from being warped. In order to maximize such an anti-warpage effect, at least a portion of the heat dissipation protrusions 110b may extend in the first direction, and the beam member 250 (FIG. 1) may extend on the bottom surface of the bottom cover 110 in the second direction perpendicular to the first direction. However, embodiments are not limited thereto.

As shown in FIG. 19, at least one sidewall of the bottom cover 110 may have a structure that may be hooked with the support member 240 of the display apparatus.

At least one first coupling protrusion 111 may be formed at an inner portion of at least one sidewall of the bottom cover 110, and at least one second coupling protrusion 112 may protrude from an outer portion of the sidewall.

The at least one first coupling protrusion 111 and the at least one second coupling protrusion 112 may be alternately formed at the sidewall of the bottom cover 110, and the first and second coupling protrusions 111 and 112 may be hooked with the support member 240.

Figure 20:
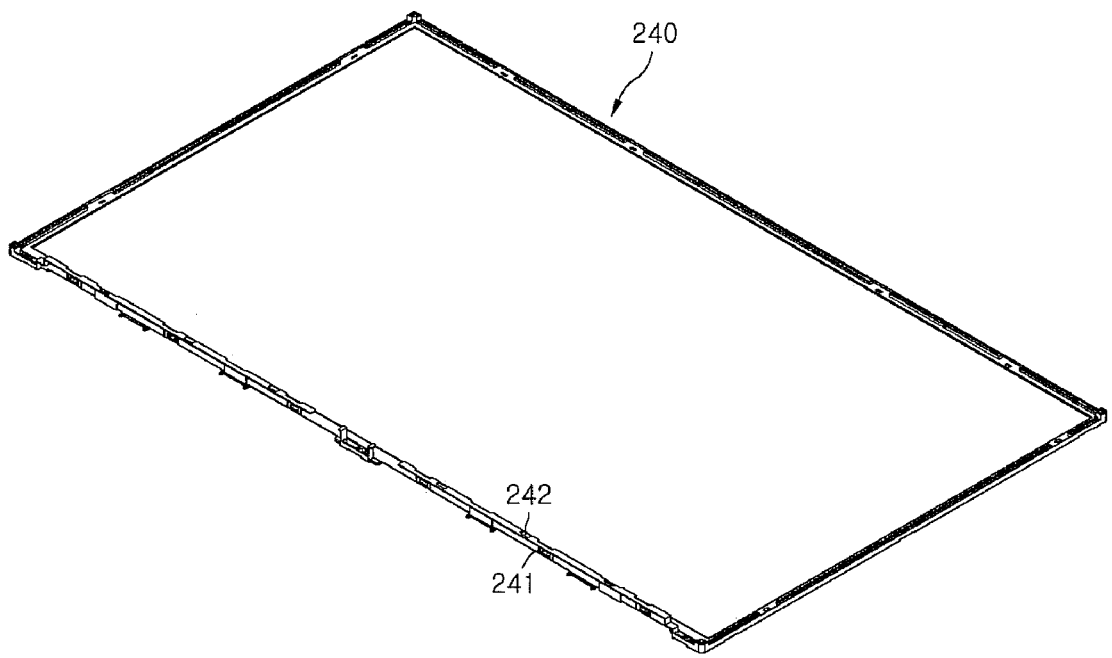
FIG. 20 is a perspective view showing a support member of a display apparatus according to an embodiment.
Figure 21:
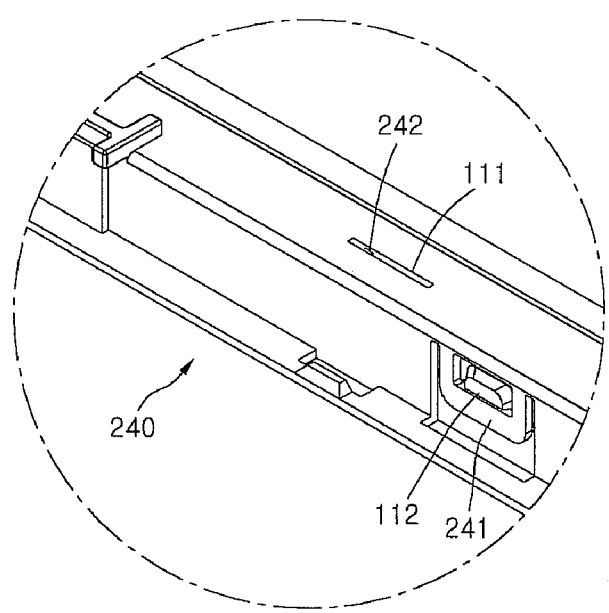
FIG. 21 is a view showing a coupling relation between a support member and a bottom cover of a display apparatus according to an embodiment.

FIG. 20 is a perspective view showing the support member 240 of the display apparatus according to an embodiment. FIG. 21 is a view showing a coupling relation between the support member 240 and the bottom cover 110.

As shown in FIGS. 18 to 21, the support member 240 may include first and second coupling holes 242 and 241, which may correspond to the first coupling protrusion 111 and the second coupling protrusion 112 of the bottom cover 110, respectively, on at least one sidewall of the support member 240.

The first coupling protrusion 111 may be inserted into the first coupling hole 242, and the second coupling protrusion 112 may be inserted into the second coupling hole 241 by making the support member 240 face the bottom cover 110, so that the support member 240 can be coupled with the bottom cover 110.

For example, as shown in FIG. 21, the first coupling protrusion 111 may protrude toward the inside of the sidewall of the bottom cover 110, and an end portion of the first coupling protrusion 111 may be bent and directed upward. The second coupling protrusion 112 may protrude toward an outside of the sidewall of the bottom cover 110, and the lateral surface of the second coupling protrusion 112 may be inclined, so that the support member 240 may be slidably mounted on the bottom cover 110.

The support member 240 may be hooked with the bottom cover 110 without a coupling member such as a screw, so that the assembling process of the display apparatus may be simplified, and thickness of an outer peripheral portion (i.e., a bezel) of the display apparatus may be reduced.

The support member 240 may be screwed with the bottom cover 110. The support member 240 may be coupled with the bottom cover 110 through any one of various coupling schemes.

Figure 22:
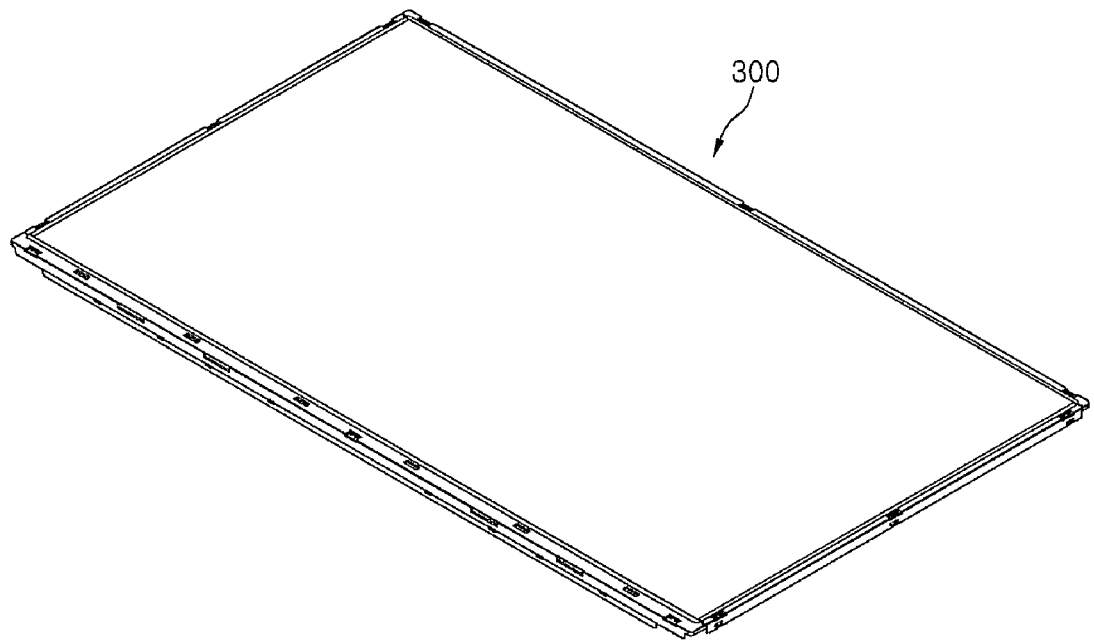
FIG. 22 is a perspective view showing a top cover of a display apparatus according to an embodiment.

FIG. 22 is a perspective view showing the top cover 300 of the display apparatus.

As shown in FIGS. 1 and 21, the top cover 300 may form an outer appearance of the display apparatus, and the top cover 300 may be coupled with a top surface and an outer peripheral surface of the support member 240.

For example, a coupling member such as a screw may pass through the overlap area between the top cover 300 and the support member 240, or an inner portion of the top cover 300 may be hooked with the outer portion of the support member 240, so that the top cover 300 can be fixedly coupled with the support member 240, although embodiments are not limited thereto.

Referring to FIG. 2, the display panel 210 may include a lower substrate 211 and an upper substrate 212, which face each other and are bonded to each other to maintain uniform cell gaps, and a liquid crystal layer provided between the lower and upper substrates 211 and 212. A plurality of gate lines and a plurality data lines crossing the gate lines may be formed on the lower substrate 211, and thin film transistors TFT may be formed at a cross region of the gate lines and the data lines. The upper substrate 212 may be provided thereon with color filters. The display panel 210 may not be limited to the above structure, and may have various structures.

For example, the lower substrate 211 may include the color filters as well as the thin film transistors. The display panel 210 may have various shapes based on schemes of driving the liquid crystal layer.

A gate driving PCB of supplying scan signals to the gate lines and a data driving PCB of supplying data signals to the data lines may be provided at edges of the display panel 210.

A polarizing film (not shown) may be provided in at least one of upper and lower portions of the display panel 210.

The optical sheet part 220 may be provided between the display panel 210 and the backlight unit 100.

The optical sheet part 220 may include a diffusion sheet (not shown) and/or a prism sheet (not shown).

The diffusion sheet may uniformly diffuse a light output from the light guide plate, and the diffused light may be concentrated on the display panel by the prism sheet. The prism sheet may selectively include a horizontal prism sheet and/or a vertical prism sheet, and/or at least one illuminance enhancement film. However, types or a number of optical sheet parts 220 may increase or decrease within the technical scope of the embodiment, although embodiment are not limited thereto.

A plurality of guide pins (not shown) may be formed on an internal lateral surface of the bottom cover 110 to attach the optical sheet part 220 such that the optical sheet part 220 is not shaken. If the guide pins (not shown) are formed, the optical sheet part 220 may be formed therein with a plurality of holes corresponding to the guide pins (not shown). The guide pins (not shown) may be inserted into the holes, such that the optical sheet part 220 can be attached.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A backlight unit comprising:
    a plurality of optical assemblies that each separately includes:
        a light emitting module having a substrate, a plurality of light emitting devices on a top surface of the substrate to emit a light, and a connector on a bottom surface of the substrate,
        a light guide plate that includes a first part to receive light from one of the light emitting devices and a second part to output the light through a top surface of the light guide plate,
        a side cover fixing the light emitting module and a portion of the first part of the light guide plate, and the side cover having a plurality of connector holes on the bottom surface thereof, and
    a bottom cover to receive the plurality of optical assemblies.

2. The backlight unit of claim 1, wherein the connector of the light emitting module is provided in one of the connector holes to electrically connect to a power supply unit.

3. The backlight unit of claim 2, wherein the power supply unit is provided on a surface of the bottom cover.

4. The backlight unit of claim 1, wherein the light emitting module includes a first light emitting module to serve as a master and a second light emitting module to serve as a slave that is driven by the first light emitting module,
    wherein a position of the connector of the first light emitting module is different from a position of the connector of the second light emitting module.

5. The backlight unit of claim 4, wherein the plurality of connector holes of the side cover includes n+1 connector holes, where n is a total number of the second light emitting modules that are dependent from one first light emitting module.

6. The backlight unit of claim 1, wherein the side cover includes a groove to receive the light emitting module, and one end of the side cover extends along a bottom surface of the light guide plate.

7. The backlight unit of claim 1, further comprising a thermal pad between the light emitting module and the side cover.

8. The backlight unit of claim 1, further comprising a reflective sheet on a bottom surface of the light guide plate.

9. The backlight unit of claim 1, wherein a bottom surface of the light guide plate is inclined, and a thickness of the light guide plate gradually decreases in one direction.

10. The backlight unit of claim 1, wherein adjacent optical assemblies at least partially overlap each other.

11. The backlight unit of claim 1, wherein the backlight unit is divided into a plurality of divisional driving regions by the plurality of optical assemblies, and a brightness of each divisional driving region is adjusted based on an image signal.

12. The backlight unit of claim 1, wherein each light emitting device includes at least one light emitting diode (LED).

13. The backlight unit of claim 1, wherein the light guide plate includes prism patterns on a top surface, and scattering patterns on a bottom surface.

14. A display apparatus comprising:
    the backlight unit of claim 1;
    an optical sheet part over the backlight unit; and
    a display panel to display an image using light from the backlight unit.

15. The display apparatus of claim 14, further comprising a beam member on a bottom surface of the bottom cover.

16. An optical assembly comprising:
    a light emitting module having a substrate, a plurality of light emitting devices on a first surface of the substrate to emit a light, and at least one power connector on a second surface of the substrate;
    a light guide plate that includes a first part to receive light from the light emitting devices and a second part to output the light through a surface, wherein the light guide plate has an inclined surface; and
    a cover provided over a portion of the first part of the light guide plate, at a side of the light emitting module and under the light emitting module, and the cover having a plurality of connector holes on a bottom surface the cover.

17. The optical assembly of claim 16, wherein the light emitting module includes a first light emitting module to serve as a master and at least one second light emitting module to serve as a slave that is driven by the first light emitting module,
   wherein a position of the power connector for the first light emitting module is different from a position of a power connector for the second light emitting module.

18. The optical assembly of claim 17, wherein the cover includes a groove to receive the light emitting module, and one end of the cover extends along the inclined surface of the light guide plate.

19. The optical assembly of claim 18, wherein the cover further includes a first hole on a top surface of the cover, and a second hole corresponding to the first hole on the bottom surface of the cover, and a coupling member extends through the first hole, the second hole, and the light emitting module.

* * * * *